United States Patent
Campagna et al.

(10) Patent No.: US 10,291,408 B2
(45) Date of Patent: May 14, 2019

(54) GENERATION OF MERKLE TREES AS PROOF-OF-WORK

(71) Applicant: Amazon Technologies, Inc., Seattle, WA (US)

(72) Inventors: Matthew John Campagna, Bainbridge Island, WA (US); Nicholas Alexander Allen, Kirkland, WA (US); Gregory Alan Rubin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 15/389,991

(22) Filed: Dec. 23, 2016

(65) Prior Publication Data

US 2018/0183601 A1    Jun. 28, 2018

(51) Int. Cl.
  *H04L 9/32*  (2006.01)
  *G06F 21/60*  (2013.01)
  *H04L 29/06*  (2006.01)

(52) U.S. Cl.
  CPC .......... *H04L 9/3247* (2013.01); *G06F 21/602* (2013.01); *H04L 9/3239* (2013.01); *H04L 63/1441* (2013.01); *G06F 2221/2103* (2013.01)

(58) Field of Classification Search
  CPC . H04L 9/3247; H04L 9/30; H04L 9/14; H04L 9/0643; H04L 9/0861
  See application file for complete search history.

(56) References Cited

U.S. PATENT DOCUMENTS

| | | | |
|---|---|---|---|
| 2016/0260091 A1* | 9/2016 | Tobias | G06Q 20/3678 |
| 2016/0301531 A1* | 10/2016 | Finlow-Bates | G06F 21/33 |
| 2016/0330034 A1* | 11/2016 | Back | G06Q 20/06 |
| 2017/0031676 A1* | 2/2017 | Cecchetti | G06F 8/65 |
| 2017/0126702 A1* | 5/2017 | Krishnamurthy | H04L 63/123 |
| 2017/0132621 A1* | 5/2017 | Miller | G06Q 20/3829 |
| 2017/0163425 A1* | 6/2017 | Kaliski, Jr. | H04L 9/3242 |
| 2017/0318008 A1* | 11/2017 | Mead | H04L 63/1466 |
| 2018/0025167 A1* | 1/2018 | Bohli | G06F 21/602 |
| 2018/0039667 A1* | 2/2018 | Pierce | G06F 17/30371 |
| 2018/0053182 A1* | 2/2018 | Mokhasi | G06Q 20/3829 |
| 2018/0088928 A1* | 3/2018 | Smith | G06F 8/65 |
| 2018/0089465 A1* | 3/2018 | Winstrom | G06F 21/64 |

OTHER PUBLICATIONS

Biryukov, Alex et al., "Egalitarian computing", 25th USENIX Security Symposium Aug. 10-12, 2016 • Austin, TX, pp. 319-326. (Year: 2016).*

(Continued)

*Primary Examiner* — Michael Pyzocha
(74) *Attorney, Agent, or Firm* — Davis Wright Tremaine LLP; Timothy Chou

(57) ABSTRACT

A proof-of-work system where a first party (e.g., a client computer system) may request access to a computing resource. A second party (e.g., a service provider) may determine a challenge that may be provided to the first party. A valid solution to the challenge may be generated and provided for the request to be fulfilled. The challenge may include a message and a seed, such that the seed may be used at least in part to cryptographically derive information that may be used to generate a solution to the challenge. A hash tree may be generated as of generating the solution.

20 Claims, 6 Drawing Sheets

(56) References Cited

OTHER PUBLICATIONS

Coelho, Fabien An (Almost) Constant-Eort Solution-Verication Proof-of-Work Protocol based on Merkle Trees (extended and colored version of [7]), 1st international conference on Progress in cryptology, Jun. 2008, Casablanca,, Morocco, pp. 1-8. (Year: 2008).*
Biryukov, Alex et al., "Equihash: Asymmetric Proof-of-Work Based on the Generalized Birthday Problem", Cryptology ePrint Archive, Report 2015/946, pp. 1-16. (Year: 2015).*
Dang, "Recommendation for Applications Using Approved Hash Algorithms" NIST Special Publication 800-107, Revision 1, National Institute of Standards and Technology (NIST), Aug. 2012, retrieved on Nov. 24, 2015, from http://csrc.nist.gov/publications/nistpubs/800-107-rev1/sp800-107-rev1.pdf, 25 pages.

* cited by examiner

GENERATION OF MERKLE TREES AS PROOF-OF-WORK

BACKGROUND

Computer networks have evolved to provide sophisticated functionality in a large variety of contexts. Providing such functionality, however, often involves complex systems that malicious entities may try to exploit. One such attack involves denial-of-service attacks, which can be disruptive to computer systems on a network. In a distributed denial-of-service attack, for instance, large numbers of requests are sent to a computer system to attempt to overload the computer system. One way to mitigate against such attacks is to configure a service such that requests to the service incur some sort of expense, thereby providing a disincentive to participating in the attack. One such expense involves imposing a condition that a client submitting a request expend more computational resources (e.g., CPU cycles) to cause the request to be fulfilled. Other contexts also involve issues that are addressable, at least in part, through imposition of an expense in exchange for a service's operation.

However, imposing such expenses in exchange for computer system functionality is often probabilistic in nature, meaning that the expense may vary, often significantly. In other words, making a request may sometimes incur a higher computational expense and sometimes incur a lower computational expense. The variance in expenses may detrimentally impact requestor systems that provide assurances of performance (e.g., a quality-of-service assurances) which are based at least in part on accessing computational resources of a service that imposes such expenses in exchange for access to the computational resources.

BRIEF DESCRIPTION OF THE DRAWINGS

Various techniques will be described with reference to the drawings, in which.

DETAILED DESCRIPTION

Figure 1:
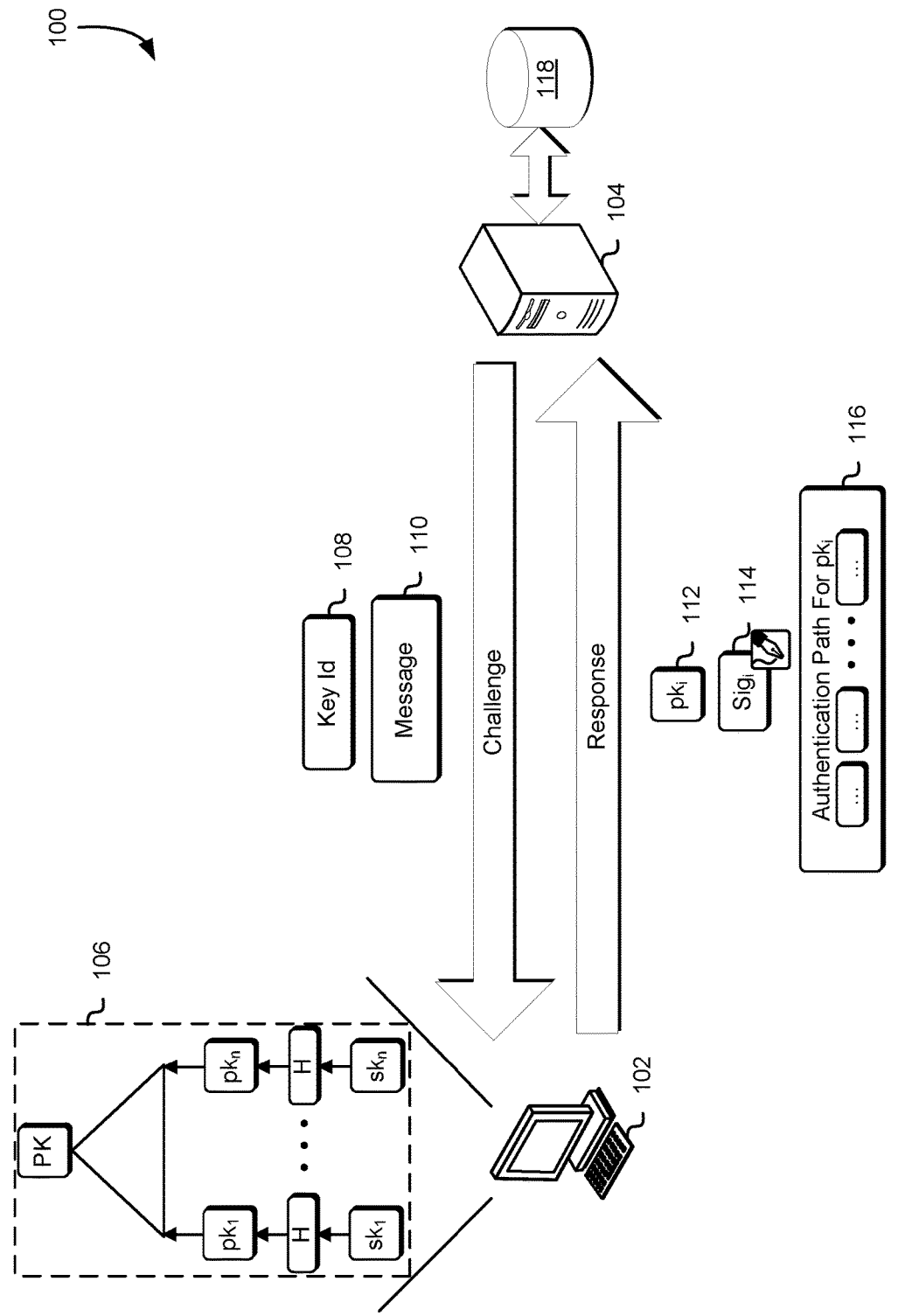
FIG. 1 shows an illustrative example of an environment in which various embodiments may be practiced.

This document describes techniques for using the generation of Merkle trees as a solution to a proof-of-work challenge. A proof-of-work system may refer to a system where, to obtain access to computer system functionality, a party may solve a problem and provide a proof-of-work as a solution to the problem to a counterparty that is able to verify the solution to the problem is correct. After the counterparty verifies the solution is correct, the party may be able to obtain one or more computing resources. A proof-of-work problem may be more computationally difficult to solve than to verify the solution. As an example, to generate a complete binary hash tree having a depth of r (r a positive integer), a system may computationally generate $2^r$ leaf nodes and perform $2^r-1$ cryptographic hash operations in order to generate the root node. The hash tree may then be used to generate an authentication path from a leaf node to the root node. Verifying that a provided node value is a leaf node of the binary tree may involve a counterparty computationally generating r hashes using the provided node value and each collected node of the authentication path and compare the output against the root node value which may be obtained separately.

In some embodiments, a Merkle tree is used at least in part to generate a proof-of-work solution in response to a challenge. A client may make an application programming (API) request to a service provider to obtain one or more backend computing resources of the service provider. Prior to or as part of fulfilling the request, the service provider may issue a challenge to the client and, as part of a proof-of-work system, provide access to the requested computing resources on a condition that the client provide a valid solution to the challenge. In some embodiments, the client may provide a valid solution to a challenge for every request (e.g., as part of a mining process for cryptocurrencies such as Bitcoin). However, in other embodiments, the client may be required to provide a solution to a challenge upon the detection of one or more conditions. For example, a service provider may require all clients to provide a valid proof-of-work during periods of abnormally high network traffic and/or when the service provider detects an indication that the service provider may subject to a denial-of-service (DOS) or distributed denial-of-service (DDOS) attack. A denial-of-service attack may refer to an attack where a malicious party attempts to prevent a computer system from operating normally by flooding the computer system with requests beyond the system's capacity, either reducing responsiveness of the system or causing the system to stop responding to legitimate requests entirely. A distributed denial-of-service attack may refer to a denial-of-service attack performed by multiple devices where the attack by the multiple devices may be coordinated by one or more parties. In some embodiments, a proof-of-work may be required for specific types of devices such as webcams and digital video recorder (DVR) devices that are identified as having potential security vulnerabilities that make such devices more likely to be participants of a DDOS attack.

In some embodiments, when the service provider detects an unusual traffic pattern (e.g., a sudden and unexpected increase in identical or similar requests), the service provider may require that all requests be accompanied by a valid proof-of-work. Requiring a valid proof-of-work may mitigate a DOS or DDOS attack by causing the participants of the DOS or DDOS attack to generate a valid proof-of-work solution, which may require the use of computational resources on the attacking systems and dramatically reduce the rate at which entities participating in the attack may send requests.

In some embodiments, the client may generate a Merkle tree in response to receiving a challenge. The challenge may include instructions to generate a Merkle tree of a specified depth, seed information that may be used to derive nodes of the Merkle tree, and a message. As an example, a challenge may include generating a Merkle tree using a SHA-256 cryptographic hash algorithm having a root node value with 32 leading zeroes and to sign a provided message using the first signing key (e.g., corresponding to the leftmost leaf node) of the Merkle tree. More generally, a challenge may require one or more nodes to have specific patterns. As an example, a challenge may require that at each depth of the Merkle tree, the node contains a number of leading zeroes at least equal to its height (e.g., leaf nodes can have any value, parents of the leaf nodes must start with at least one leading zero, grandparents of the leaf nodes must start with at least two leading zeroes, and so on). The client may provide a root node of a Merkle tree (e.g., the root node of the entire tree generated or the root node of a subtree) to the service provider as part of a first communication in connection with the challenge.

The challenge may include instructions to generate a Merkle tree and specify that a message should be signed using a particular signing key of the Merkle tree. In some embodiments, the seed information may include a key identifier corresponding to a signing key of the Merkle tree. In some embodiments, the challenge includes a work factor. The work factor of a Merkle tree may refer to the number of hash operations that are needed to generate a complete Merkle tree. For example, a binary tree having $2^r=n$ leaf nodes may have a work factor on the order of $2^r-1$ based on the number of hash operations that would be required to generate a root node given n leaf nodes.

A message may be provided as part of a challenge. In some embodiments, the client generates a digital signature over the message using a cryptographic key. More generally, the message may include data that may be provided to the client as part of a challenge and may be used in connection with determining the validity of a purported solution to a challenge that may be provided by the client to the service provider. In some embodiments, the message includes a nonce. A nonce may be an arbitrary number, such as a random or pseudo-random number, or may be deterministically selected, for example, a timestamp or counter. In some embodiments, the message includes a timestamp that may be used as part of the verification of the solution. For example, the message may include a timestamp wherein the timestamp includes an expiration time before which the solution must be received (e.g., giving the client a fixed duration in which to provide a solution to the challenge). In other embodiments, the message may include a timestamp of when the message was transmitted or generated.

As part of providing a solution to the challenge, the client may obtain a signing key pair in accordance with the seed information, generate a digital signature using the private signing key of the obtained key pair and the provided message, and generate an authentication path from the leaf node of the public signing key to the root node. The client may provide as part of a response to the challenge: the public signing key corresponding to the key identifier included in the challenge; the digital signature generated using the private signing key and the message, authenticity of the digital signature being verifiable using at least the public signing key and the authentication path between the public signing key and the public key corresponding to the root node. The client may provide the public signing key and the authentication path to the service provider as part of a second communication in connection with the challenge.

The service provider may receive the proof-of-work solution to the challenge. The service provider may verify digital signature using the public signing key and message. The received authentication path may be used to verify a path from the signing key to the root node to verify that the key used to generate the digital signature is a node of the Merkle tree. After verifying that a solution to a challenge has been correctly solved, the system may fulfill the request. In some embodiments, the system may send an implicit indication that the request has been fulfilled (e.g., providing a requested resource to the requestor) or may send an explicit indication that the request has been fulfilled (e.g., sending an acknowledgement that the solution was received and/or verified to be a correct solution to the challenge).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment in which various embodiments can be implemented. The computing environment 100 illustrates a client 102 and a service provider 104 where a Merkle tree 106 is used at least in part to generate a proof-of-work in response to a challenge. The client 102 may be a client computer that makes a request to a service provider 104 to obtain one or more computing resources (e.g., the computing resource 118 shown in FIG. 1) accessible to the service provider 104 via a backend system. The client 102 may be implemented using software, hardware, or a combination of both, and may be connected to the service provider 104 via any appropriate network, including an intranet, the Internet, a cellular network, a local area network, a satellite network or any other such network and/or combination thereof.

The service provider 104 may be implemented using software, hardware, or a combination of both. The service provider 104 may comprise a frontend service and one or more backend services. The frontend service may direct a client's request to some of the backend services, which in turn fulfill the requested access to the one or more computing resources. In some embodiments, some of the backend services may use an authentication module to authenticate the client's identity as part of or prior to the fulfillment of the request.

In some embodiments, the client 102 may provide a request to the service provider 104 to obtain one or more computing resources such as the computing resources 118 shown in FIG. 1. Computing resources may include data storage, virtual machine computer instances, network access, and more. Prior to or as part of fulfilling the request, the service provider 104 may issue a challenge to the client 102 and require that the client provide a valid solution to the challenge prior to providing access to the requested computing resources. In some embodiments, the client may provide a valid solution to a challenge for every request (e.g., as part of a mining process for cryptocurrencies such as Bitcoin). However, in other embodiments, the client may be required to provide a solution to a challenge only under certain circumstances. For example, a service 104 may require all clients to provide a valid proof-of-work during periods of abnormally high network traffic and/or when the service provider 104 detects an indication that the service provider may subject to a denial-of-service (DOS) or distributed denial-of-service (DDOS) attack. In some embodiments, a system may issue proof-of-work challenges upon exceeding an upper network traffic threshold (e.g., where the rate of incoming requests to the service provider exceeds a predetermined threshold). A denial-of-service attack may refer to an attack where a malicious party attempts to prevent a computer system (such as the service provider 104 shown in FIG. 1) from operating normally by flooding the computer system with requests beyond the system's capacity, either reducing responsiveness of the system or causing the system to stop responding to legitimate requests entirely. As a second example, a service provider 104 may require one or more particular clients to provide a valid proof-of-work based on the frequency, volume, and/or type of request(s) that it receives from a particular client. A distributed denial-of-service attack may refer to a denial-of-service attack performed by multiple devices where the attack by the multiple devices may be coordinated by one or more parties. In some embodiments, a proof-of-work is required based on the device type of the client making the request, which may be determined based at least in part on whether the device or device type of the client making the request. For example, a proof-of-work may be required for devices such as webcams and digital video recorder (DVR) devices that may be identified as having potential security vulnerabilities that make such devices more likely to be participants of a DDOS attack.

In some embodiments, when the service provider 104 detects an unusual traffic pattern (e.g., a sudden and unexpected increase in identical or similar requests), the service provider 104 may require that all requests be accompanied by a proof-of-work, and that any requests that do not include a proof-of-work are discarded or throttled. Likewise, requests that are accompanied by a proof-of-work but which is invalid (e.g., based on the verification of the solution) may be discarded or throttled as well. A discarded request may refer to a request that is not serviced or fulfilled in the normal course of operations. In some embodiments, the service provider 104 may have a queue of requests to fulfill and will refuse to enqueue a request that lack a proof-of-work or whose proof-of-work is invalid. Throttling requests may refer to limiting the frequency of requests from a client that the system will allow to be submitted and/or limiting the frequency for how often requests for a client are fulfilled. By requiring clients to provide a valid proof-of-work, a DOS or DDOS attack may be mitigated because requests from systems that lack a proof-of-work will not be serviced, and the generation of a valid proof-of-work will take additional computational resources that may dramatically reduce the rate at which entities participating in the attack may send requests.

In some embodiments, the client 102 may generate a Merkle tree 106 in response to receiving a challenge. The Merkle tree 106 shown in FIG. 1 may be generated in accordance with techniques below, for example, in connection with FIG. 2. The challenge may include instructions to generate a Merkle tree of a specified depth, a key identifier 108 corresponding to a signing key, and a message 110 for which a digital signature should be generated on using the signing key. In some embodiments, the challenge further includes additional requirements regarding one or more nodes of the Merkle tree. As an example, a challenge may include generating a Merkle tree using a SHA-256 cryptographic hash algorithm having a root node value with 32 leading zeroes and to sign a provided message using the first signing key (e.g., corresponding to the leftmost leaf node) of the Merkle tree. More generally, a challenge may require one or more nodes to have specific patterns. As an example, a challenge may require that at each depth of the Merkle tree, the node contains a number of leading zeroes at least equal to its height (e.g., leaf nodes can have any value, parents of the leaf nodes must start with at least one leading zero, grandparents of the leaf nodes must start with at least two leading zeroes, and so on).

The challenge may include instructions to generate a Merkle tree and specify that a message should be signed using a particular signing key corresponding to a key identifier 108. In some embodiments, the client 102 may generate a Merkle tree 106 and provide a root node (such as the public key PK) of the Merkle tree to the service provider 104 prior to receiving the key identifier 108 and message 110. The service provider may store (e.g., in a cache or database) the root node value which may be as part of a verification process for determining the validity of an authentication path. In some embodiments, the key identifier is an index of a key to be used. For example, the key index may be a number between 1 and n (inclusive of endpoints) where n is the number of leaf nodes of the Merkle tree. In some embodiments, the number of leaf nodes corresponds to a work factor related to the generation of the Merkle tree. The work factor of a Merkle tree may refer to the number of hash operations that are needed to generate a complete Merkle tree. For example, a binary tree having $2^r=n$ leaf nodes may have a work factor on the order of $2^r-1$ based on the number of hash operations that would be required to generate a root node given n leaf nodes.

The message 110 may be provided as part of a challenge, and in some embodiments, the client 102 generates a digital signature over the message using a cryptographic key. More generally, the message 110 may include data that may be provided to the client as part of a challenge and may be used in connection with determining the validity of a purported solution to a challenge that may be provided by the client 102 to the service provider 104. In some embodiments, the message 110 includes a nonce. A nonce may be an arbitrary number, such as a random or pseudo-random number, or may be deterministically selected, for example, a timestamp or counter. In some embodiments, the message includes a timestamp that may be used as part of the verification of the solution. For example, the message may include a timestamp wherein the timestamp includes an expiration time before which the solution must be received (e.g., giving the client a fixed duration in which to provide a solution to the challenge). In other embodiments, the message may include a timestamp of when the message was transmitted or generated.

The challenge may further include additional information that may be used as part of generating the Merkle tree. For example, the challenge may include additional parameters that are to be included as part of a pre-image to a cryptographic hash function that is used to generate one or more nodes of the Merkle tree. In some embodiments, the client 102 may receive a challenge to generate a Merkle tree wherein the pre-image to a cryptographic hash function includes information that the client 102 chooses as well as information that is provided to the client 102 by the service provider 104. For example, a client may be required to generate hashes using a SHA-256 hash algorithm where each input to the hash function is concatenated with additional information that is provided by a counterparty. The additional information may include an identifier corresponding to the client (e.g., an email address) a timestamp (e.g., a timestamp of when the request was made), an expected work factor of the challenge, and a nonce. In some embodiments, the additional information may be provided to the client 102 as part of the message 110 or separate from the message (e.g., separate from the challenge). The work factor of the challenge may indicate a size for a Merkle tree to be generated. The size of the Merkle tree may refer to the number of hash operations that are needed to generate a complete Merkle tree, the height of the Merkle tree, or various other properties that may be used to determine the size, depth, and structure of a Merkle tree.

In some embodiments, all hashes generated within the Merkle tree may use the additional information as part of the pre-image input to a cryptographic hash function. In other embodiments, some but not all of the hashes generated within the Merkle tree may use the additional information as part of the pre-image input. For example, in some embodiments, the leaf nodes may be generated using the additional information as part of the pre-image input, or the root node may be generated using the additional information as part of the pre-image input. Verification of the authentication path, likewise, may use the additional information to verify a solution to the authentication path. In generating the authentication path, the cryptographic hash function inputs may also use the additional information as part of the pre-image input.

As part of providing a solution to the challenge, the client 102 may obtain a signing key pair corresponding to the provided key identifier 108, generate a digital signature using the private signing key of the obtained key pair and the provided message 110, and generate an authentication path 116 from the leaf node of the public signing key to the root node. The client 102 may provide as part of a response to the challenge: the public signing key 112 $pk_i$ corresponding to the key identifier included in the challenge; the digital signature 114 $sig_i$ generated using the private signing key $sk_i$ and the message 110, authenticity of the digital signature being verifiable using at least the public signing key $pk_i$; and the authentication path 116 between the public signing key $pk_i$ and the public key PK corresponding to the root node which the service provider may have received in a separate communication and stored (e.g., in a cache or database) prior to providing the public signing key and message to sign.

Figure 2:
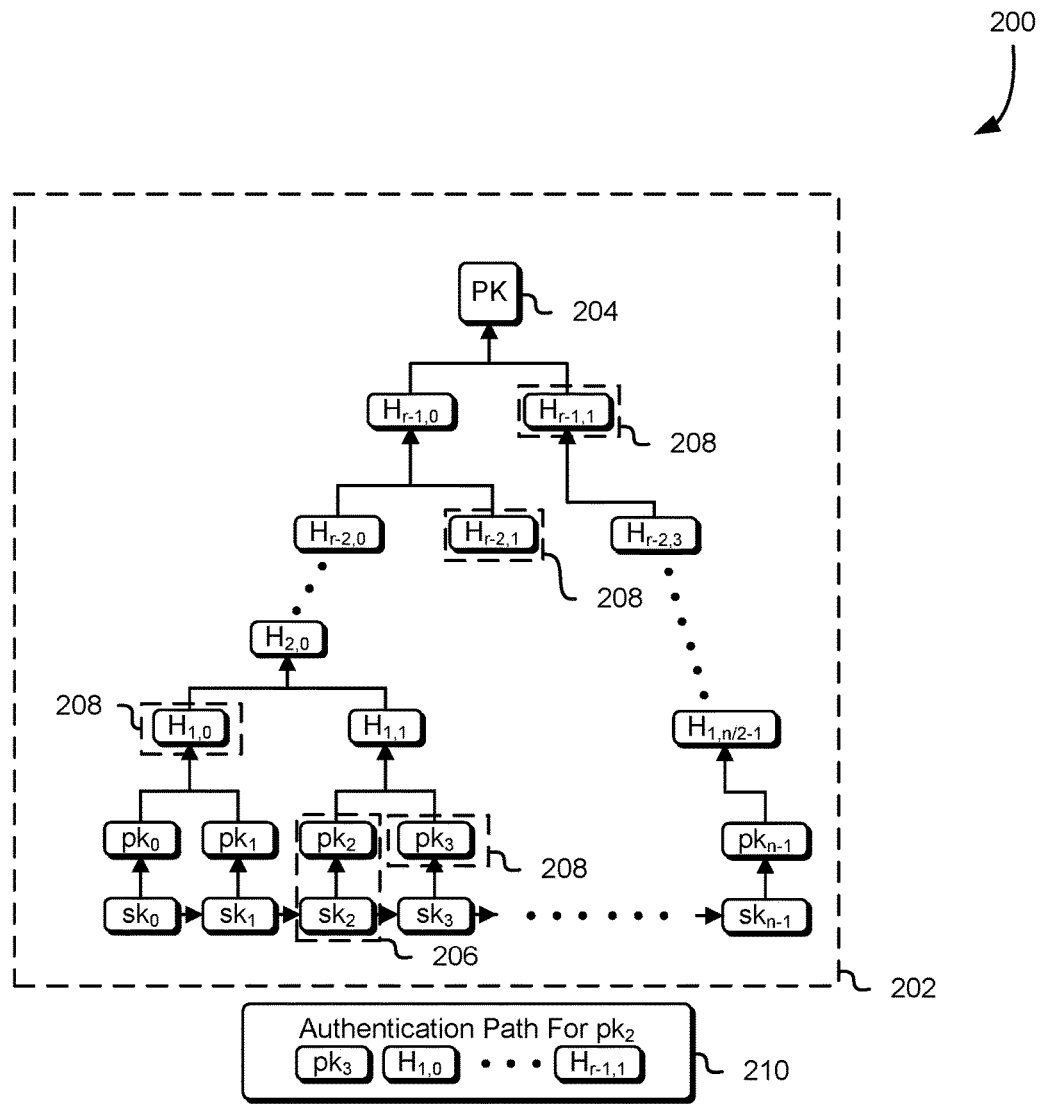
FIG. 2 shows an illustrative example of a Merkle tree and the generation of a proof-of-work.

FIG. 2 illustrates an environment in which a Merkle tree is used to generate a proof-of-work. The computing environment 200 may include computer systems that are implemented using hardware, software, or a combination thereof.

A Merkle tree 202 may be a tree-based data structure where each non-leaf node of the Merkle tree is generated by a cryptographic hash function having inputs that include at least each child node of a particular non-leaf node. The root node 204 of the Merkle tree may be a public key PK for a Merkle tree signature scheme. In some embodiments, additional information, such as a nonce may be used as inputs in addition to the child nodes as inputs to a cryptographic hash function used to generate the value of a non-leaf node. In some embodiments, the leaf nodes of a Merkle tree may be generated using any one-time signature key pairs including key pairs in accordance with a Lamport-Diffie One-Time Signature (LD-OTS) scheme or a Winternitz One-Time Signature (W-OTS) scheme. In some embodiments, a computer system may generate the leaf nodes of a Merkle tree by generating n secret key values. The secret key values, $sk_i$, may be random or pseudo-random numbers that are generated, for example, by a pseudo-random number generator (PRNG). For a binary Merkle tree, the number of secret values generated for a Merkle tree may be a power of two, but it is not required that the number of secret values be a power of two. A system may use a cryptographic hash function to generate the public keys $pk_i$. A secret value $sk_i$ may be an input to a cryptographic hash function and the corresponding public key $pk_i$ may be the output. A cryptographic hash function or pseudo-random function may be used to generate the public key. The pair $\{sk_i, pk_i\}$ may be referred to as a signing key pair. The leaf nodes of the Merkle tree may be the public keys. FIG. 2 shows an example of a binary Merkle tree.

While the example Merkle trees shown in FIGS. 1-2 are exemplary binary Merkle trees, any k-ary tree (i.e., a tree structure wherein each node has at most k child nodes) may be used in place of or in combination with other tree structures. For example, in some embodiments, a ternary tree (i.e., a tree structure wherein each node has at most three child nodes) may be used in place of or in addition to a binary tree.

A cryptographic function may generally refer to a function that deterministically maps a domain of inputs (e.g., a pre-image) to a range of outputs (e.g., an image) in a manner that appears truly random. Thus, given the output of a cryptographic hash function, it should be no more likely that any value in the domain of inputs was more likely to have generated the output than another value in the domain. Additionally, because cryptographic hash functions deterministically maps a domain of inputs to a range of outputs, the same input will generate the same output. Examples of cryptographic hash functions include the secure hash algorithm 2 (SHA-2) hash functions such as SHA-256 and SHA-512.

An authentication path 210 may refer to a collection of nodes 208 (i.e., hash values of the nodes) that may be used to verify that a first node and a second node are connected nodes of a Merkle tree. For example, an authentication path 210 may be formed from a public signing key $pk_j$ of the signing key pair 206 to the root node PK 204. An authentication path 210 may be verified by hashing the public signing key $pk_j$ with the first node of the authentication path, and iteratively hashing the hash outputs with the next node of the authentication path. The authentication path 210 is verified if the final output after iteratively hashing the public key $pk_j$ with all nodes of the authentication path is equal to the root node 204. The same principle described here may be applied to build an authentication path between any non-leaf node and a descendent node. In some embodiments, additional information may be obtained that may be used to determine how the authentication path should be verified. For example, the additional information may include information regarding the position of the public signing key $pk_j$, information regarding the position of the respective nodes included in the authentication path, or both. The additional information may be used, for example, to determine the order in which values should be concatenated to verify the authentication path. For example, the information may be used to determine whether a verification process should generate a hash $H(pk_j, H_{o,t_j})$ or $H(H_{o,t_j}, pk_j)$ as part of verifying the authentication path where $H_{o,t_j}$ is the first node of the collected nodes of an authentication path and the inputs to hash function H( ) are concatenated in the order in which the inputs appear. The additional information may, for example, include the position of the public signing key $pk_j$ in the Merkle tree, which may be used to determine the order in which the nodes of the authentication path should be concatenated in for each iterative hash.

In some embodiments, the leaf nodes, intermediate nodes, root node, and combinations thereof may be generated in accordance in a specific format. A specific format may refer how the nodes are generated, the values of the nodes, and more. For example, a specific format may require that a node be generated using a cryptographic hash that includes a first component that is chosen by the client and a second component that is chosen by the party providing the challenge (e.g., the service provider described above in connection with FIG. 1), where the second component may include information that is generated in response to receiving a request, such as information regarding the user identity (e.g., an email address associated with a requestor such as the client described above in connection with FIG. 1), the request (e.g., timestamp based at least in part on the request), and/or a nonce for the request. Additionally, a specific format may require that a node have a specific output value format. For example, a specific format may require that a leaf node generated from a cryptographic hash function be generated having a predetermined number of leading zeros. In some embodiments, a SHA-256 cryptographic hash algorithm may be used to generate Merkle tree leaf node values where the hash function output has a specified number of leading zeros (e.g., 32 leading zeros). As a second example, a format may be specified such that the intermediate nodes are derived based at least in part on the child nodes as well as additional information. The additional information may include, for example, information regarding the user identity, request, and/or a nonce for the request. The root node may be of a specified format as well.

A counterparty may also provide information that may be used as part of generation of one or more nodes of the Merkle tree. As an example, the service provider of FIG. 1 may provide the requestor one or more public signing key values which may be used as the leaf node values for the Merkle tree solution to a proof-of-work challenge. In some embodiments, the specific format may be generated using a combination of techniques described above. For example, a first leaf node of a Merkle tree may be generated using a cryptographic hash function to result in an output having a substring value (e.g., 32 leading zeros of a SHA-256 hash output) and the remaining leaf nodes derived from the output (e.g., iteratively hashing the output to obtain one or more other leaf node values). In some embodiments, a challenge (such as the challenge described above in connection with FIG. 1) may specify how one or more nodes should be generated. The challenge may include additional information that specifies a format in which the leaf nodes should be generated.

In some embodiments, a proof-of-work may be solved by providing a solution to a challenge or an alternate solution to the challenge. In some embodiments, the counterparty may accept an alternative solution in place of the solution. As an example, a challenge may involve a proof-of-work solution that involves generation of a Merkle tree with a root node having a specific format (e.g., a SHA-256 hash function output having 32 leading zeroes) and leaf nodes that are generated using an iterative hashing technique (e.g., described above), and an alternative solution may involve the generation of a leaf node and/or intermediate node that matches the same specified format (e.g., a leaf or intermediate node having 32 leading zeroes). Thus, a solution to the challenge may involve the generation of a leaf node having the same specified format. In some embodiments, the alternate solution may involve the generation of a node having a different specified format from the specified format of the solution (e.g., a solution may involve generating a SHA-256 hash function output having 32 leading zeroes and an alternate solution may involve generating a leaf node output that is the product of two primes and identifying least one of the two primes).

Figure 3:
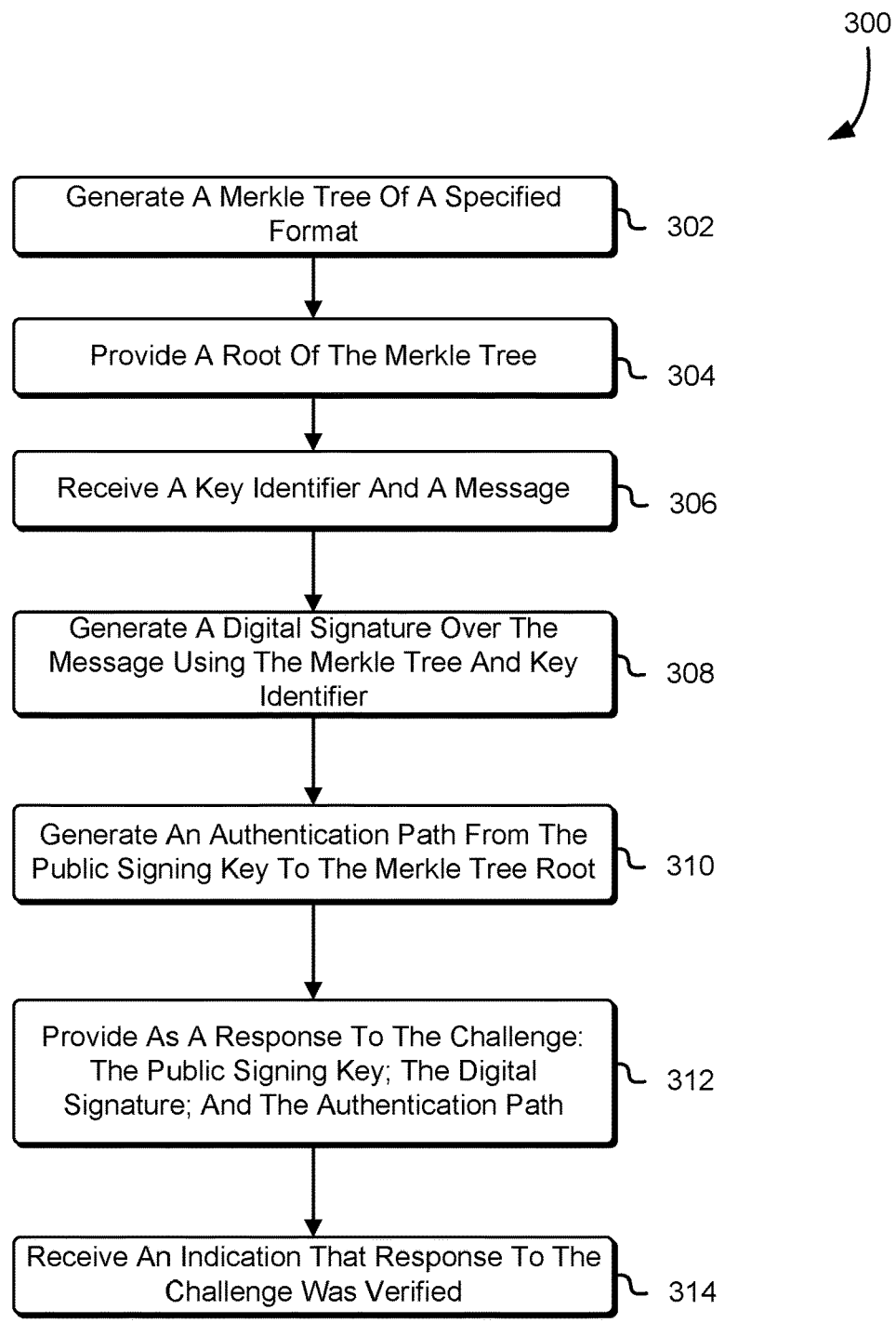
FIG. 3 shows a diagram illustrating a process for receiving and solving a proof-of-work challenge.

FIG. 3 shows an illustrative example of a process 300 for handling a challenge. Generally, the process 300 may be performed by any suitable computing environment such as environments described above in connection with FIGS. 1-2. The process may be performed as part of a process for obtaining access to one or more computing resources. For example, the process 300 may be performed by a client (e.g., client discussed in connection with FIG. 1) as part of a request to access electronic resources of a service provider (e.g., service provider discussed in connection with FIG. 1).

A computer system such as the client described above in connection with FIG. 1 may make a request to obtain access to one or more computing resources from a service provider. The service provider may respond to the request by issuing a challenge that involves generating a Merkle tree. The system (e.g., a requestor) may generate 302 a Merkle tree. The Merkle tree may be generated using techniques described above, and further, may have a specified format (e.g., the format being specified in the challenge). In some embodiments, the leaf nodes, intermediate nodes, root node, and combinations thereof may be generated in accordance in a specific format. A specific format may refer how the nodes are generated, the values of the nodes, and more. For example, a specific format may require that a node be generated using a cryptographic hash that includes a first component that is chosen by the client and a second component that is chosen by the party providing the challenge (e.g., the service provider described above in connection with FIG. 1), where the second component may include information that is generated in response to receiving a request, such as information regarding the user identity (e.g., an email address associated with a requestor such as the client described above in connection with FIG. 1), the request (e.g., timestamp based at least in part on the request), and/or a nonce for the request. Additionally, a specific format may require that a node have a specific output value. For example, a specific format may require that a leaf node generated from a cryptographic hash function be generated having a predetermined number of leading zeros. In some embodiments, a SHA-256 cryptographic hash algorithm may be used to generate Merkle tree leaf node values where the hash function output has a specified number of leading zeros (e.g., 32 leading zeros). As a second example, a format may be specified such that the intermediate nodes are derived based at least in part on the child nodes as well as additional information. The additional information may include, for example, information regarding the user identity, request, and/or a nonce for the request. The root node may be of a specified format as well. The challenge may include instructions to the system to generate a Merkle tree having a specified tree depth (e.g., to generate a Merkle tree of depth r=8 or to generate a Merkle tree having 256 leaf nodes).

More generally, the system may receive seed information that may be used as part of generation of one or more nodes of the Merkle tree. As an example, the challenge may include one or more public signing key values which are to be used as the leaf node values for the Merkle tree solution to a proof-of-work challenge. In some embodiments, a first leaf node of a Merkle tree may be generated using a cryptographic hash function to result in an output having a substring value (e.g., 32 leading zeros of a SHA-256 hash output) and the remaining leaf nodes derived from the output (e.g., iteratively hashing the output to obtain one or more other leaf node values). In some embodiments, a challenge (such as the challenge described above in connection with FIG. 1) may specify how one or more nodes should be generated. The challenge may include additional information that specifies a format in which the leaf nodes should be generated.

The computer system may provide 304 a root of the Merkle tree to the service provider. In some embodiments, the root node provided may be the root of the entire Merkle tree (e.g., the public key 204 illustrated in FIG. 2), but in some embodiments, a root node of a subtree may be provided. Continuing with FIG. 2 as an illustrative example, $H_{2,0}$ may be provided as the root node of the subtree having child nodes $H_{1,0}$ and $H_{1,1}$, and so on. Returning to FIG. 3, the system may, after providing the root node of a Merkle tree (e.g., the root of the full Merkle tree generated), receive 306 as part of a challenge a key identifier and a message. The key identifier and challenge may be provided to the system by a service provider after the service provider receives the root of the Merkle tree. In some embodiments, the key identifier may be an index position of the key that should be used to digitally sign a message. The message may include information corresponding to the user's identity (e.g., an email address) or may include information such as a nonce value which may be a counter that is incremented for each request.

The received message may be used at least in part to generate 308 a digital signature. The digital signature may be generated using the message and a signing key that is specified by the challenge, which may have been derived as part of the generation of the Merkle tree. In some embodiments, the generation of the digital signature may be performed prior to, concurrent with, or after the generation of the Merkle tree. In some embodiments, the digital signature and/or message may include a timestamp wherein the timestamp includes an expiration time before which the solution must be received (e.g., giving the client a fixed duration in which to provide a solution to the challenge). In other embodiments, the message may include a timestamp of when the message was transmitted or generated.

After or concurrent with the generation of the Merkle tree, the system may generate 310 an authentication path from the signing key to the root node of the Merkle tree. An authentication path may refer to a collection of nodes that may be used to verify that a first node and a second node are connected nodes of a Merkle tree. For example, an authentication path may be formed from a leaf node of the Merkle tree (e.g., a leaf node corresponding to the key identifier) to the root node of the Merkle tree. An authentication path may be verified by hashing the leaf node with the first node of the authentication path, and iteratively hashing the hash outputs with the next node of the authentication path. An authentication path may be generated in accordance with techniques described above, for example, in connection with FIGS. 1-2.

In response to the challenge, the system may provide 312 a digital signature over a message, the public signing key corresponding to the private signing key used to generate the digital signature, and the generated authentication path. In some embodiments, the proof-of-work may include the root node, one or more leaf nodes, an authentication path, the digital signature, or some combination thereof. In general, the proof-of-work may include information that may be used to verify a solution to a challenge, and may also provide an indication that the client committed non-trivial computing resources in the generation of the proof-of-work (e.g., performing a number of cryptographic hash operations to generate a Merkle tree). In some embodiments, a challenge may require that a system provide two sets of solutions to the challenge, where the second solution includes using a second signing key of the Merkle tree to generate a second digital signature that is also provided as part of the solution. The service provider may verify that both sets of solutions are correct. In some embodiments, the two signing keys are selected independently, but in other embodiments, the selection of the second signing key may be based on the first selected key. For example, if the first signing key is on the left side of the tree (e.g., $sk_0$ shown in FIG. 2), the system may select a second signing key from the right side of the tree (e.g., $sk_{n-1}$ shown in FIG. 2). In this way, a service provider may verify two authentication paths which provide additional assurances that the client has generated the Merkle tree.

Finally, the system may, receive 314 an indication that the solution was verified. In some embodiments, the indication that the solution was verified may be an implicit indication (e.g., the system receives a requested resource) or may be an explicit indication (e.g., the system receives an acknowledgement that the solution was received and/or verified to be a correct solution to the challenge). In some embodiments, the system may instead receive an indication that the solution was invalid and may be presented with an opportunity to re-submit a solution. For example, the system may generate a correct solution to a challenge, but the correct solution was subject to signal loss during transmission to the counterparty resulting in the verification determining the solution was incorrect. In some embodiments, the system may be given another opportunity to submit the solution as part of a second response to the challenge. The system may, for the second response to the challenge, re-use the Merkle tree that was generated (i.e., the generation of the Merkle tree a second time may be unnecessary). Likewise, the authentication path and even the provided first response may be reused in some embodiments as part of re-submitting a solution.

It should be noted that while the embodiment shown in FIG. 3 includes separate steps for a proof-of-work challenge that involves providing (e.g., in a first communication) the root of a Merkle tree, receiving a key identifier and a message, and then providing (e.g., in a second communication) a digital signature generated over the message using at least in part on the key identifier, that these steps may be consolidated such that the proof-of-work challenge may be solved in fewer communications. For example, in an embodiment, the system may generate a Merkle tree and provide the entire Merkle tree as the solution to a proof-of-work challenge. A service provider may receive the purported solution and verify one or more authentication paths of the purported solution. Verifying an authentication path may include selecting a node (e.g., a leaf node or an interior node), generate one or more expected hash values, and compare the expected hash values with those provided in the purported solution.

Figure 4:
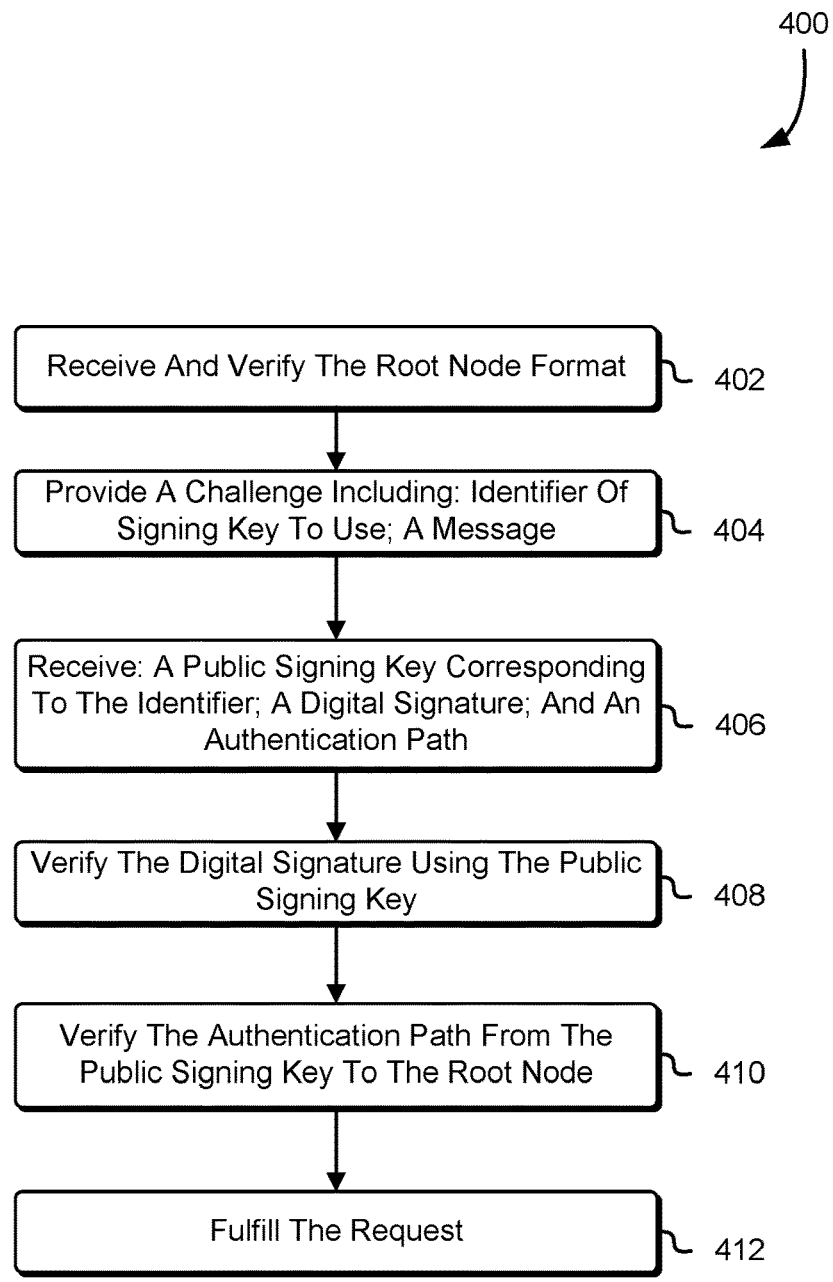
FIG. 4 shows a diagram illustrating a process for verifying the solution to a proof-of-work challenge.

FIG. 4 shows an illustrative example of a process 400 for providing a challenge and verifying a proof-of-work solution to the challenge. Generally, the process 400 may be performed by any suitable computing environment such as environments described above in connection with FIGS. 1-2. The process may be performed as part of a process for obtaining access to one or more computing resources. For example, the process 400 may be performed by a service provider (e.g., service provider discussed in connection with FIG. 1) as part of a request by a client (e.g., client discussed in connection with FIG. 1) to access electronic resources of the service provider.

The system may receive 402 the root node (e.g., from a requestor). In some embodiments a client makes a request to the system to obtain access to computing resources, the service issues a challenge to generate a Merkle tree of a specified format, and the client provides in a response the root node of the tree that the client has purportedly generated. In some embodiments, the system further verifies that the root node is of a specific format. The root node format may refer to a specific format that is expected. For example, the challenge may involve generating a Merkle tree having a root node that starts with at least a fixed number of zeroes. It should be noted, that some embodiments may allow the Merkle tree output to be of any format, but may require that the output be generated in a certain manner. For example, in some embodiments, system may provide instructions to the client that the Merkle tree should be generated using a particular cryptographic hash algorithm (e.g., SHA-256) and that a first component of the hash input may be chosen by the client, but that a second component of the hash input is of a particular format (identity information corresponding to the client, a nonce, etc.). In some embodiments, the root node value is stored and used later as part of a verification process (e.g., verifying 410 the authentication path from a public signing key to the root node). The root node value may be stored in short-term memory (e.g., volatile memory such as RAM or a cache) or long-term memory (e.g., hard disk drive). In some embodiments, the root node value may be stored in a least-recently used (LRU) cache such that there is an upper limit to the number of root node values stored by the system. If the upper limit is exceeded, the root node value for the request that was least recently used may be discarded and the least recent request may need to re-initiate its request and/or re-initiate a challenge-response cycle (e.g., generate a new Merkle tree).

A system, such as the service provider described in connection with FIG. 1, may provide 404 a challenge to a requestor that includes a seed and a message to digitally sign. A seed may refer to information that may be used by a client to cryptographically derive data that may be used to solve a challenge. For example, a seed may be used to generate a Merkle tree. In some embodiments, a seed may be used to cryptographically derive (e.g., by using the seed as an input to a cryptographic hash operation or encryption operation) a first leaf node value of a Merkle tree and derive subsequent leaf node values of the Merkle tree by iterative hashing of either the first leaf node or leaf nodes derived from the first leaf node. In some embodiments, the seed may be an identifier to a signing key. The identifier to the signing key may be an index, the key itself, or information that may be used to cryptographically derive the signing key. The seed may be determined specifically for a particular client that sent the request, for example, by including in the seed information that identifies the client. For example, the seed may include a network address or nonce that is associated with the requestor and indicate that generation of one or more nodes is performed by combining (e.g., concatenating) the information associated with the requestor with a second component that the client determines.

In some embodiments, the message includes a nonce. A nonce may be an arbitrary number, such as a random or pseudo-random number, or may be deterministically selected, for example, a timestamp or counter. In some embodiments, the message includes a timestamp that may be used as part of the verification of the solution. For example, the message may include a timestamp wherein the timestamp includes an expiration time before which the solution must be received (e.g., giving the client a fixed duration in which to provide a solution to the challenge). In other embodiments, the message may include a timestamp of when the message was transmitted or generated. In some embodiments, the system may provide 404 a challenge that omits the message and allow the client to digitally sign a message that the client generates.

It should be noted that various components of the challenge may be provided separate or together. For example, in some cases, a challenge may be generated to including a message, seed information, and a work factor and the challenge may be provided as part of a single transmission. In other examples, the various components of the challenge may be provided separately. For example, a work factor for the Merkle tree to be generated may be provided to a client even before a request is received. In such an embodiment, the client may store the work factor information separately and, in response to receiving other components of the challenge, generate a proof-of-work solution. In some embodiments, the client and service provider may coordinate transmission of the various components of a challenge. For example, after each component of a challenge is provided to a client from a service provider, the client may provide an acknowledgement that a particular component was received, and the service provider may provide another component of the challenge in response to receiving the acknowledgement.

After providing the challenge, the system may receive 406 a proof-of-work solution to the challenge. The proof-of-work may include information that may be used by the system to determine whether the solution to the challenge is correct. In some embodiments, verifying the solution to a proof-of-work challenge may be computationally easier than generating the solution. The computational complexity of a challenge may refer to the complexity class of a challenge in accordance within the field of computational complexity theory. In some embodiments, the computational complexity of verifying the solution to a challenge is easier than the computational complexity of generating a correct solution. For example, a challenge to digitally sign a message using a Merkle signature scheme may involve, as part of generating a correct solution, performing $2^r$ cryptographic hash operations where r is the depth of the generated Merkle tree. Conversely, verifying that a signing key used to generate a digital signature is a leaf node of a Merkle tree may involve performing r cryptographic hash operations to verify an authentication from a leaf node (corresponding to a signing key) to the root node. As a second example, a system may generate a two prime numbers and provide, as a challenge, the product of the primes to a client wherein the solution to the problem is to factor the provided product. In some embodiments, the system receives 404 a proof-of-work solution that includes a digitally signature, a public key corresponding to the private key used to generate the digital signature, a root node of a Merkle tree, and an authentication path from a leaf node corresponding to the signing key to the root node of a Merkle tree.

The system may verify 408 the digital signature using the public signing key. Verification of the digital signature may involve determining the authenticity and integrity of the message and digital signature. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. The received authentication path may be used to verify 410 a path from the signing key to the root node—in other words, to verify that the key used to generate the digital signature is a node of the Merkle tree. In some embodiments, system may have previously received (e.g., in step 402) and stored the root node value. In some embodiments, additional information may be obtained that may be used to determine how the authentication path should be verified. For example, the additional information may include information regarding the position of the public key, information regarding the position of the respective nodes included in the authentication path, or both. The additional information may be used, for example, to determine the order in which values should be combined to verify the authentication path. For example, the information may be used to determine how a verification process should generate a hash as part of verifying the authentication path (e.g., the order in which node values should be concatenated). The additional information may, for example, include the position of the public signing key in the Merkle tree.

In some embodiments, verification of the solution to a challenge may include verification of the root node format, verification of the digital signature, and verification of the authentication path in various orders and in some embodiments may be performed in parallel or in a nondeterministic order. Additionally, other verification steps may be taken in accordance with the specific challenges presented. In some embodiments, the system may also verify that an alternative solution was provided and was correct. After verifying that a solution to a challenge has been correctly solved, the system may fulfill 412 the request. In some embodiments, the system may send an implicit indication that the request has been fulfilled (e.g., providing a requested resource to the requestor) or may send an explicit indication that the request has been fulfilled (e.g., sending an acknowledgement that the solution was received and/or verified to be a correct solution to the challenge).

In some embodiments, a challenge may involve generating a public key of an asymmetric signature scheme. For example, a challenge may involve generating the public key of a Merkle signature scheme, wherein the public key of the signature scheme includes combining the public signing key values of the Merkle tree (e.g., concatenating the leaf node values of a Merkle tree). In some embodiments, a system that receives a solution to the challenge may further receive the public key and verify that the challenge was completed by using the public signing key to verify the authenticity of the digital signature and using the public key of the signature scheme to verify that the public signing key used to generate the digital signature is in accordance with the signature scheme (e.g., verifying an authentication path from the public signing key to the root node of the Merkle tree). In this way, a service provider may verify both that the signing key was both used to sign the message and a key of the signature scheme.

It should be noted that while the embodiment shown in FIG. 4 includes separate steps for receiving (e.g., in a first communication) the root node value, providing a key identifier and a message, and then receiving (e.g., in a second communication) a public signing key, a digital signature, and an authentication path, that these steps may be consolidated such that the proof-of-work challenge may be solved in fewer communications. For example, in an embodiment, the system may receive a Merkle tree as the solution to a proof-of-work challenge. The system receive the purported solution and verify one or more authentication paths of the purported solution by selecting a node (e.g., a leaf node or an interior node) and generating one or more expected hash values, and compare the expected hash values with node values provided in the Merkle tree. In some embodiments, the number of paths and/or the length of the paths verified by the system may vary based, for example, on whether a particular client has previously provided correct solutions (e.g., an indicator that a particular client may be trustworthy when it provides a purported Merkle tree solution) or has previously provided incorrect solutions (e.g., an indicator that a particular client may not actually be doing the work to generate a Merkle tree in its purported solutions).

Figure 5:
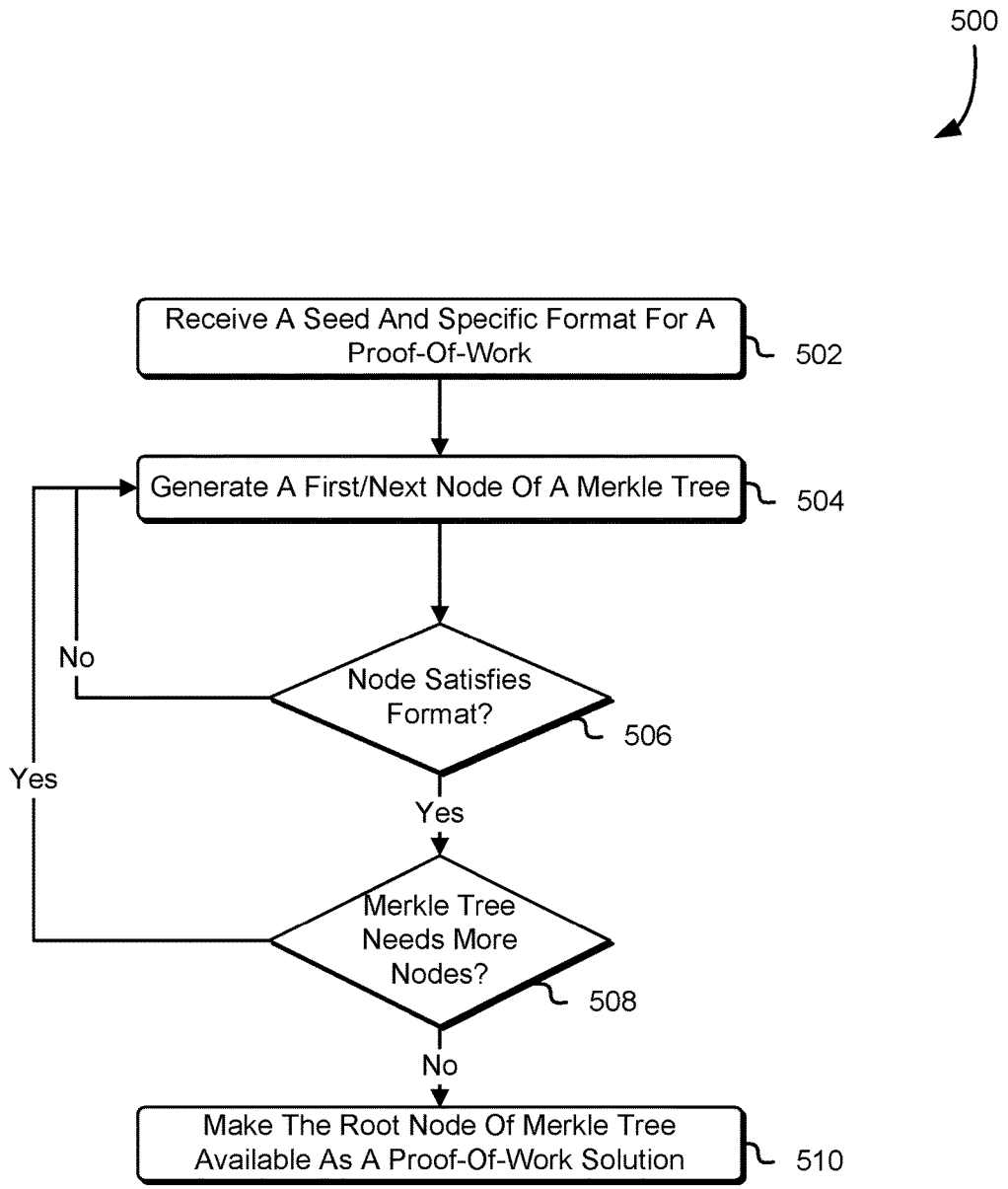
FIG. 5 shows a diagram illustrating a process for generating a Merkle tree as a proof-of-work.

FIG. 5 shows an illustrative example of a process 500 for generating a proof-of-work solution to a challenge. Generally, the process 500 may be performed by any suitable computing environment such as environments described above in connection with FIGS. 1-4. The process may be performed as part of a process for obtaining access to one or more computing resources. For example, the process 500 may be performed by a client (e.g., client discussed in connection with FIG. 1) as part of a response to a challenge received from a service provider (e.g., service provider discussed in connection with FIG. 1).

A computer system such as a client described above in connection with FIG. 1 may receive 502, for example from a challenge, a seed and a specific format for which the proof-of-work should conform to. The seed may refer to information that may be used to derive (e.g., based at least in part on performing a cryptographic operation) one or more nodes. In some embodiments, the seed may be directly used in the generation of one or more leaf nodes (e.g., where the seed is part of an input to a cryptographic hash function whose output corresponds to the one or more leaf nodes) or generate the leaf nodes indirectly (e.g., generating leaf nodes through iterative hashing from a seed value). A specific format may refer how the nodes are generated, the values of the nodes, and more. For example, a specific format may require that a node be generated using a cryptographic hash that includes a first component that is chosen by the client and a second component that is chosen by the party providing the challenge (e.g., the service provider described above in connection with FIG. 1), where the second component may include information that is generated in response to receiving a request, such as information regarding the user identity, the request, and/or a nonce for the request. Additionally, a specific format may require that a node have a specific output value. For example, a specific format may require that a leaf node generated from a cryptographic hash function be generated having a predetermined format. In some embodiments, a SHA-256 cryptographic hash algorithm may be used to generate Merkle tree leaf node values where the hash function output has a specified number of leading zeros (e.g., 32 leading zeros). As a second example, a format may be specified such that the intermediate nodes are derived based at least in part on the child nodes as well as additional information. The additional information may include, for example, information regarding the user identity, request, and/or a nonce for the request. The root node may be of a specified format as well.

In some embodiments, the seed 504 is used to generate a first node of the Merkle tree. For example, leaf nodes may be generated by using a cryptographic hash function that combines an input selected by the system (e.g., a counter value) combined with a seed that includes a network address associated with the system (e.g., internet protocol (IP) address or email address). The first node may be generated in accordance with techniques described above, for example, in connection with FIGS. 1-4. The system may check 506 whether the generated node satisfies the specific format. For example, in some embodiments, the first leaf node may be required to have a predetermined format. If the generated node does not satisfy the specified format, then the system may discard one or more nodes (or even all nodes of the Merkle tree being generated) and generate a new first node value. For example, consider the case where a specified format requires that all leaf nodes be generated with a predetermined number of leading zeroes and that leaf nodes are generated by iteratively hashing wherein a first leaf node having a predetermined zeroes is hashed to generate a second leaf node also having a predetermined number of zeroes, and so on until all leaf nodes have been generated through iterative hashing to have a predetermined number of leading zeroes. The system may, after generating a first leaf node with a predetermined number of leading zeroes, calculate a hash over the first leaf node and determine that the hashed value does not have a predetermined number of leading zeroes. In some embodiments, the leaf nodes are discarded and the system may repeat the process by generating 504 a first node of the Merkle tree as described above until all nodes match the specified format. After each node is generated, the system checks 508 whether more nodes are needed for the Merkle tree and may repeat this process until all nodes are generated. Note that the process may vary in accordance with the specified format. For example, in the case where only one leaf node has a specified format (e.g., a leaf node used as a seed for iterative hashing) the system may, after checking 506 that the node satisfies the specified format, then generate the remaining nodes of the Merkle tree without needing the check the format of the remaining nodes as their values do not need to conform to a specific format. Likewise, intermediate nodes and/or the root node may not need to be checked to have a specific format if there are no such formats being specified against those nodes. The challenge may specify how many nodes the system should generate for the Merkle tree (e.g., by including a work factor indicating the height of the Merkle tree).

Finally, the system may, after generating the Merkle tree, make available 510 the root node as part of a proof-of-work solution to a challenge. In some embodiments an authentication path between a node (e.g., a node cryptographically derived from the provided seed) and the root node may also be provided as part of the solution. In some embodiments, such as those in accordance with a Merkle signature scheme, may provide a generated public key. The generated public key, for a Merkle signature scheme, may refer to the set of public signing keys generated in the Merkle tree that may be used to generate digital signatures, for example, in accordance to a one-time hash-based signature scheme such as a LD-OTS scheme or a W-OTS scheme.

Figure 6:
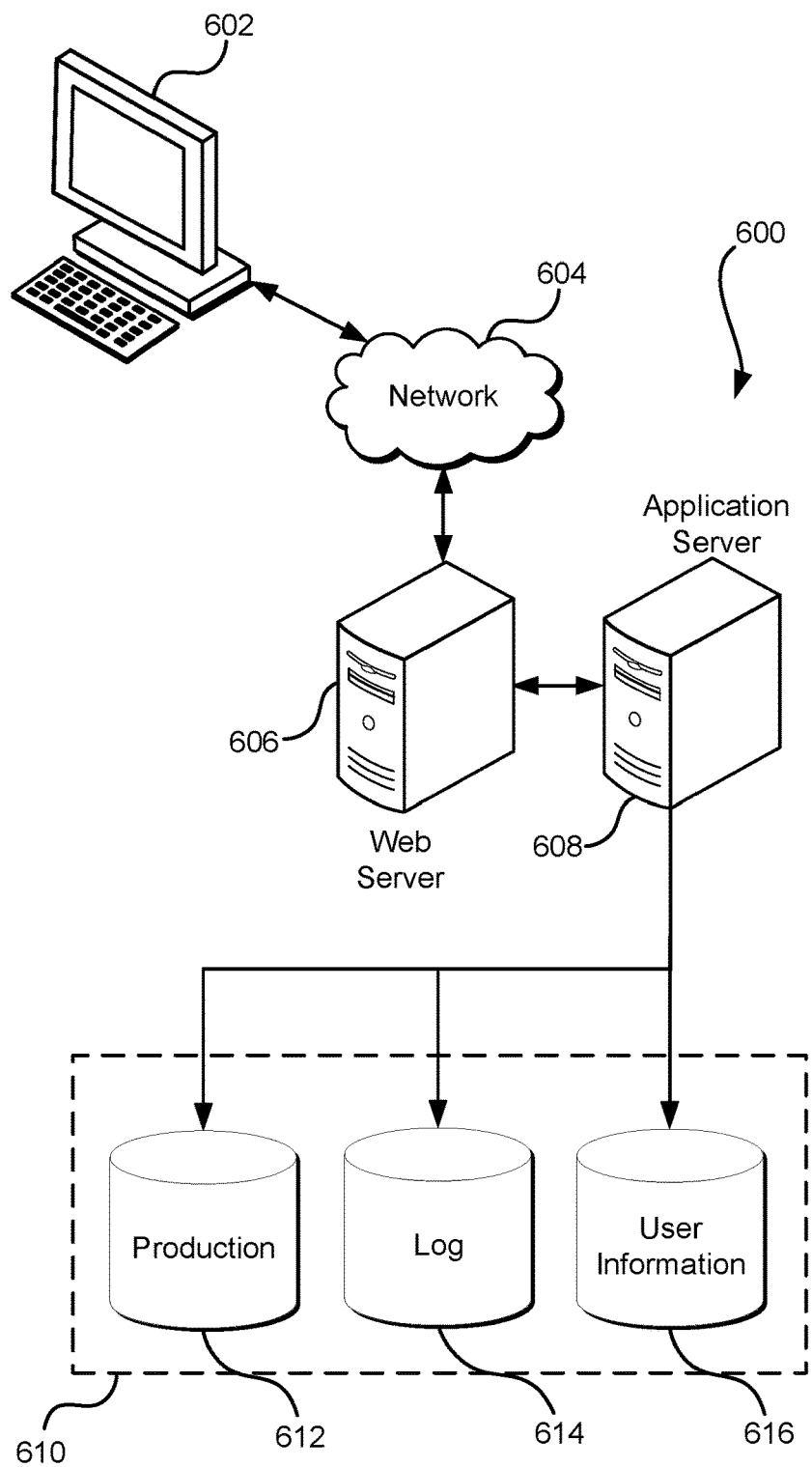
FIG. 6 illustrates an environment in which various embodiments can be implemented.

FIG. 6 illustrates aspects of an example environment 600 for implementing aspects in accordance with various embodiments. As will be appreciated, although a web-based environment is used for purposes of explanation, different environments may be used, as appropriate, to implement various embodiments. The environment includes an electronic client device 602, which can include any appropriate device operable to send and/or receive requests, messages, or information over an appropriate network 604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 602 and the application server 608, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 610 can include several separate data tables, databases, data documents, dynamic data storage schemes and/or other data storage mechanisms and media for storing data relating to a particular aspect of the present disclosure. For example, the data store illustrated may include mechanisms for storing production data 612 and user information 616, which can be used to serve content for the production side. The data store also is shown to include a mechanism for storing log data 614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. The application server 608 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a client computer system, a request to access a computing resource in a computing resource service provider environment;
    providing, to the client computer system, a first component of a challenge, the first component comprising a seed and a work factor that indicate a size for a Merkle tree to be generated;
    obtaining, from the client computer system, a root node of a generated Merkle tree;
    providing, to the client computer system, a second component of the challenge, the second component comprising a message and an identifier corresponding to a public key in accordance with a Merkle digital signature scheme;
    obtaining, from the client computer system:
        a digital signature generated based at least in part on the message provided to the client computer system;
        the public key; and
        a set of values that enables verification of the digital signature using the public key;
    using the public key, the set of values, the root node, and the message to verify that the public key was generated based at least in part on the seed and that, using the Merkle digital signature scheme, that the digital signature is valid; and
    fulfilling the request in response to verifying that the digital signature is valid and that the public key was generated based at least in part on the seed.

2. The computer-implemented method of claim 1, wherein one or more leaf nodes of the Merkle tree to be generated are cryptographically derivable from the seed.

3. The computer-implemented method of claim 1, wherein the message comprises an identifier corresponding to the client computer system and a timestamp.

4. The computer-implemented method of claim 1, wherein verifying that the public key was generated based at least in part on the seed includes:
    performing one or more cryptographic operations to generate an output based at least in part on the public key and one or more values of the set of values; and
    determining the generated output and the obtained root node match.

5. A system, comprising:
    one or more processors; and
    memory storing executable instructions that, if executed by the one or more processors, cause the system to:
        obtain, from a client computer system, a request to access a computing resource;
        determine a challenge, the challenge involving generation of at least a portion of a hash tree for a digital signature scheme, the challenge encoding additional data;
        obtain proof of completion of the challenge, the proof comprising a digital signature generated based at least in part on the additional data;
        use the digital signature scheme and the digital signature to verify that the at least the portion of the hash tree was generated; and
        provide access to the computing resource on a condition that the digital signature is valid.

6. The system of claim 5, wherein the memory stores executable instructions that, if executed by the one or more processors, further cause the system to:
    obtain a root node of the hash tree from a requestor;
    make the challenge available to the requestor in response to obtaining the root node of the hash tree; and
    verify that the at least portion of the hash tree was generated by further generating an expected root node and comparing the expected root node with the obtained root node.

7. The system of claim 5, wherein the memory stores executable instructions that, if executed by the one or more processors, further cause the system to:
    obtain at least a subtree of the hash tree;
    verify, using the at least subtree, that the at least the portion of the hash tree was generated; and
    access to the computing resource is further conditioned upon using the at least subtree to verify that the at least portion of the hash tree was generated.

8. The system of claim 5, wherein:
    the challenge comprises seed information, one or more nodes of the hash tree being cryptographically derivable based at least in part on the seed information;
    a first input to a cryptographic hash function is based at least in part on the seed information and a first leaf node of the hash tree is generated based at least in part on a corresponding first output of the cryptographic hash function; and
    a second input to the cryptographic hash function is based at least in part on the first leaf node and a second leaf node of the hash tree is generated based at least in part on a corresponding second output of the cryptographic hash function.

9. The system of claim 5, wherein:
    the challenge further involves generation of a public key of an asymmetric key digital signature scheme; and
    the instructions to use the digital signature scheme and the digital signature to verify that the at least the portion of the hash tree was generated includes instructions to verify authenticity of the digital signature based at least in part on the public key.

10. The system of claim 5, wherein the hash tree is a non-binary tree.

11. The system of claim 5, wherein the system further provides the challenge to a requestor based at least in part on detecting one or more network traffic conditions.

12. The system of claim 11, wherein the system further detects a device type of the requestor and provides the challenge to the requestor further based at least in part on the device type detected.

13. A non-transitory computer-readable storage medium having stored thereon executable instructions that, as a result of being executed by one or more processors of a computer system, cause the computer system to at least:
   obtain, from a client computer system, a request to access a computing resource;
   provide a challenge indicating a set of parameters for generation of a hash tree for a digital signature scheme;
   obtain proof of completion of the challenge, the proof comprising a digital signature generated based at least in part on at least a portion of the set of parameters;
   use the digital signature scheme and the digital signature to verify completion of the challenge; and
   provide access to the computing resource on a condition that the digital signature is valid.

14. The non-transitory computer-readable storage medium of claim 13, wherein the challenge comprises an identifier corresponding to the client computer system and indicates that generation of one or more nodes of the hash tree is based at least in part on an output of a cryptographic hash function having an input based at least in part on the identifier corresponding to the client computer system.

15. The non-transitory computer-readable storage medium of claim 13, wherein the set of parameters indicates one or more nodes of the hash tree have a predetermined format.

16. The non-transitory computer-readable storage medium of claim 13, wherein the executable instructions further cause the computer system to:
   obtain, in response to providing the set of parameters for generation of the hash tree for the digital signature scheme, a root node of the hash tree;
   provide, in response to obtaining the root node, a message and an indicator of the node in the hash tree with which to digitally sign the message; and
   verify the digital signature using at least the message.

17. The non-transitory computer-readable storage medium of claim 13, wherein proof of completion of the challenge includes providing the hash tree.

18. The non-transitory computer-readable storage medium of claim 13, wherein the challenge indicates one or more nodes of the hash tree are to be generated in accordance with a one-time hash-based signature scheme.

19. The non-transitory computer-readable storage medium of claim 13, wherein the executable instructions further cause the computer system to obtain additional information, wherein verification of the completion of the challenge further includes using at least the additional information and the set of parameters to cryptographically derive a root node of the hash tree.

20. The non-transitory computer-readable storage medium of claim 13, wherein the set of parameters includes a nonce that is used at least in part to cryptographically derive one or more nodes of the hash tree.

* * * * *